United States Patent
Kincaid et al.

(10) Patent No.: US 11,548,978 B2
(45) Date of Patent: Jan. 10, 2023

(54) CURABLE EPOXY SYSTEM

(71) Applicant: Huntsman Advanced Materials Americas LLC, The Woodlands, TX (US)

(72) Inventors: Derek Kincaid, Spring, TX (US); Dong Le, Richmond, TX (US); Madhi Ghazizadeh, Houston, TX (US); Tao Tao, Houston, TX (US)

(73) Assignee: HUNTSMAN ADVANCED MATERIALS AMERICAS LLC, The Woodlands, TX (US)

( * ) Notice: Subject to any disclaimer, the term of this patent is extended or adjusted under 35 U.S.C. 154(b) by 0 days.

(21) Appl. No.: 16/955,111

(22) PCT Filed: Dec. 17, 2018

(86) PCT No.: PCT/US2018/066077
§ 371 (c)(1),
(2) Date: Jun. 18, 2020

(87) PCT Pub. No.: WO2019/126073
PCT Pub. Date: Jun. 27, 2019

(65) Prior Publication Data
US 2020/0385515 A1 Dec. 10, 2020

Related U.S. Application Data

(60) Provisional application No. 62/609,173, filed on Dec. 21, 2017.

(51) Int. Cl.
| | | |
|---|---|---|
| C08J 5/24 | (2006.01) | |
| B32B 27/38 | (2006.01) | |
| C08G 59/24 | (2006.01) | |
| C08G 59/30 | (2006.01) | |
| C08G 59/56 | (2006.01) | |
| C08G 59/50 | (2006.01) | |
| C08K 7/06 | (2006.01) | |

(52) U.S. Cl.
CPC .............. *C08G 59/50* (2013.01); *C08G 59/30* (2013.01); *C08J 5/243* (2021.05); *C08J 5/249* (2021.05); *C08K 7/06* (2013.01); *C08J 2363/02* (2013.01)

(58) Field of Classification Search
CPC . B32B 27/38; C08J 5/24; C08L 63/00; C08G 59/245; C08G 59/308; C08G 59/5033; C08G 59/504; C08G 59/56
USPC ............... 428/297.4, 413; 523/427, 428
See application file for complete search history.

(56) References Cited

U.S. PATENT DOCUMENTS

| | | |
|---|---|---|
| 6,054,221 A | 4/2000 | Weigel et al. |
| 2012/0004349 A1 | 1/2012 | Kaneko et al. |
| 2015/0018456 A1 | 1/2015 | Hefner, Jr. et al. |
| 2015/0210847 A1 * | 7/2015 | Mortimer ................. C08L 79/08 525/410 |
| 2016/0152763 A1 * | 6/2016 | Meegan .................... C08K 5/18 252/182.13 |
| 2016/0176083 A1 * | 6/2016 | Meegan ............ B29C 45/14631 523/467 |
| 2017/0226277 A1 | 8/2017 | Schroetz et al. |
| 2019/0077905 A1 * | 3/2019 | Bansal ............... C08G 59/5073 |
| 2019/0127514 A1 * | 5/2019 | Meegan ............... C08G 59/188 |
| 2020/0140722 A1 * | 5/2020 | Hackett .............. C08G 59/5033 |

FOREIGN PATENT DOCUMENTS

| | | | |
|---|---|---|---|
| EP | 0203828 A1 | 12/1986 | |
| JP | 2013213168 A * | 10/2013 | ............. C08G 59/42 |
| WO | 2017198675 A1 | 11/2017 | |

OTHER PUBLICATIONS

Hexcel. "HexForce® and HexPly® Aerospace Selector Guide" (Year: 2002).*

* cited by examiner

*Primary Examiner* — Michael J Feely
(74) *Attorney, Agent, or Firm* — Huntsman Advanced Materials Americas LLC; Lewis D. Craft

(57) ABSTRACT

A curable epoxy system useful in the production of composites capable of being used in various industries, including, for example, the aerospace industry. In particular, the present disclosure relates to a curable epoxy system comprising (i) an epoxy component selected from bisphenol C diglycidyl ether, one or more derivatives of bisphenol C diglycidyl ether, and combinations thereof, and (ii) 9,9-bis(4-amino-3-chlorophenyl)fluorene.

17 Claims, No Drawings

CURABLE EPOXY SYSTEM

CROSS REFERENCE TO RELATED APPLICATIONS

This application is the National Stage application filed under 35 U.S.C. § 371 of International Application No. PCT/US2018/066077 filed December 17, 2018, which designated the United States and which claims priority to U.S. Provisional Application No. 62/609,173 filed December 21, 2017. The noted applications are incorporated herein by reference in their entirety.

STATEMENT REGARDING FEDERALLY SPONSORED RESEARCH OR DEVELOPMENT

Not applicable.

FIELD

The present disclosure generally relates to a curable epoxy system useful in the production of composites capable of being used in various industries, including the aerospace industry. In particular, the present disclosure relates to a curable epoxy system comprising (i) an epoxy component selected from bisphenol C diglycidyl ether, one or more derivatives of bisphenol C diglycidyl ether, and combinations thereof, and (ii) 9,9-bis(4-amino-3-chlorophenyl)fluorene. The present disclosure also relates to curable fiber reinforced epoxy systems and composites produced therefrom.

BACKGROUND

Curable epoxy compounds can be mixed with a variety of components to form curable epoxy systems that, when cured, form composites that can be used in myriad of industries, such as green energy, sports equipment, electronics, construction, automotive, and aerospace. Such curable epoxy systems can also be used to form coatings or reinforced foams that are useful in a number of applications.

Whether using a curable epoxy system to form a coating or a composite, it is necessary to heat the curable epoxy system in order for it to cure. However, curing is typically an exothermic reaction, which produces additional heat that needs to be controlled in order to prevent overheating the curable epoxy system. Overheating the curable epoxy system can damage the system as well as the coated substrate or composite produced therefrom. As such, there is a need in the art to better control the heat present when reacting (i.e., curing) curable epoxy systems. One means for doing so is by reducing the cure enthalpy of the curable epoxy systems, which reduces the amount of heat generated during curing. Reducing the cure enthalpy has the added benefit of leading to reduced curing cycles, which allows for improved manufacturing efficiencies and, ultimately, reduced manufacturing costs.

It would therefore be advantageous to provide a curable epoxy system having a lower cure enthalpy, but which still has the requisite physical properties for use in industrial applications, including, for example, in the aerospace industry.

DETAILED DESCRIPTION

Before explaining at least one embodiment of the present disclosure in detail, it is to be understood that the present disclosure is not limited in its application to the details of construction and the arrangement of components or steps or methodologies set forth in the following description. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference and to the extent that they do not contradict the instant disclosure.

All of the compositions and/or methods disclosed herein can be made and executed without undue experimentation in light of the present disclosure. While the compositions and methods of the present disclosure have been described in terms of embodiments or preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

In addition, the phrase "at least one of X, Y, and Z" will be understood to include X alone, Y alone, and Z alone, as well as any combination of X, Y, and Z. Likewise, the phrase "at least one of X and Y" will be understood to include X alone, Y alone, as well as any combination of X and Y. Additionally, it is to be understood that the phrase "at least one of" can be used with any number of components and have the similar meanings as set forth above.

The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCCC, CBBAAA, CABBB, and so forth. The skilled artisan will understand that typically there is no limit on the number of items or terms in any combination, unless otherwise apparent from the context. In the same light, the terms "or combinations thereof" and "and combinations thereof" when used with the phrases "selected from" or "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the terms "% by weight", "wt %", "weight percentage", or "percentage by weight" are used interchangeably.

The phrase "substantially free" shall be used herein to mean present in an amount less than 1 weight percent, or less than 0.1 weight percent, or less than 0.01 weight percent, or alternatively less than 0.001 weight percent, based on the total weight of the referenced composition.

As used herein, the term "ambient temperature" refers to the temperature of the surrounding work environment (e.g., the temperature of the area, building or room where the curable composition is used), exclusive of any temperature changes that occur as a result of the direct application of heat to the curable composition to facilitate curing. The ambient temperature is typically between about 10° C. and about 30° C., more specifically about 15° C. and about 25° C. The term "ambient temperature" is used interchangeably with "room temperature" herein.

As used herein, the terms "cure enthalpy" and "reaction enthalpy" refer to the energy released by a curable epoxy system during the curing process. Cure enthalpy is measured using, for example, differential scanning calorimetry ("DSC") and is expressed in units of Joules per gram ("J/g"). It is known in the art that cure enthalpy can be directly correlated to the likelihood that a curable composition will experience a temperature exotherm during curing, especially as curing cycles are shortened. A temperature exotherm exceeding the maximum curing temperature of the curable epoxy system can damage the curable epoxy system, the resulting composite, and possibly the substrates or molds present when curing.

As used herein, the term "cure cycle" means the period over which a curable epoxy system is heated, wherein the heat applied is (i) increased from ambient temperature to a set cure temperature, (ii) held at the set cure temperature for a period of time, and (iii) cooled back to ambient temperature.

The term "cure ramp rate", abbreviated $R_{CR}$, is used herein to mean the rate at which the heating temperature during the cure cycle is increased from ambient temperature to the set cure temperature. The units of the cure ramp rate can be expressed as, for example, ° C./minute, BTUs, or Joules/minute.

As used herein, the phrase "max overshoot temperature" is used herein to mean the maximum temperature reached in the center of a composition being cured or the center of a part prepared using composite formation processes known by a person of ordinary skill in the art, including, for example, prepreg or liquid resin processing methods.

As used herein, the phrase "glass transition temperature" (abbreviated "Tg") means the temperature at which the mechanical properties of a material (e.g., a cured resin) radically change due to the internal movement of the polymer chains that form the material.

The term "bisphenol C diglycidyl ether" as used herein refers to the condensation product of trichloroacetal and phenol as illustrated in formula (I) below:

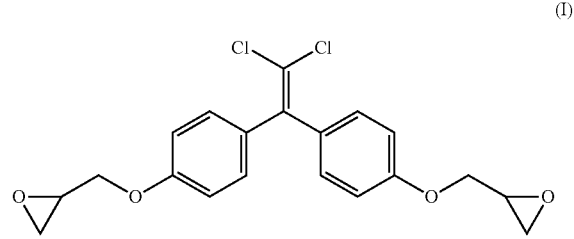 [SMILES: ClC(Cl)=C(c1ccc(OCC2CO2)cc1)c1ccc(OCC2CO2)cc1]

(I)

The terms "bisphenol C diglycidyl ether", "BCDGE", "Bis C diglycidyl ether", "diglycidyl ether, bisphenol C", "DGEBC", and "bisphenol C" are used interchangeably herein and all refer to the condensation product of trichloroacetal and phenol as set forth in formula (I).

As used herein, the term "CAF" refers to the compound 9,9-bis(4-amino-3-chlorophenyl)fluorene illustrated in formula (II) below:

(II)

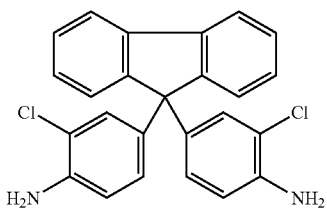

Turning to the present disclosure, it was unexpectedly found that a curable epoxy system comprising (i) an epoxy component selected from bisphenol C diglycidyl ether, one or more derivatives of bisphenol C diglycidyl ether, and combinations thereof, and (ii) 9,9-bis(4-amino-3-chlorophenyl)fluorene has a cure enthalpy less than 300 J/g, and in some cases, less than 200 J/g. It was even more unexpected that such a curable epoxy system also has a glass transition temperature (Tg) greater than 190° C. The combination of a cure enthalpy less than 300 J/g and a Tg greater than 190° C. renders the presently claimed curable epoxy system advantageous for use in the formation of industrial composites, including composites for the aerospace industry.

According to one aspect, the present disclosure is directed to a curable epoxy system comprising (i) an epoxy component selected from bisphenol C diglycidyl ether, one or more derivatives of bisphenol C diglycidyl ether, and combinations thereof, and (ii) 9,9-bis(4-amino-3-chlorophenyl)fluorene ("CAF").

The one or more derivatives of bisphenol C diglycidyl ether are represented by formula (III):

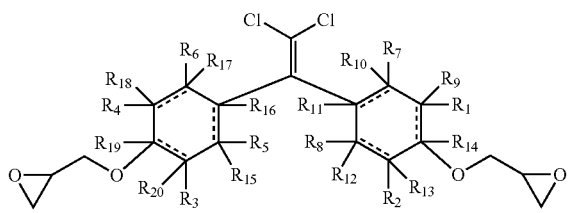

(III)

wherein the rings are independently cyclic aliphatic or aromatic with the proviso that when the rings are aromatic $R_9$-$R_2$ are nothing and one or more of $R_1$-$R_4$ is not hydrogen, and wherein $R_1$-$R_2$ are each independently selected from hydrogen, halogens, hydroxyls, alkoxys, straight aliphatics, branched aliphatics, cyclic aliphatics, substituted aliphatics, unsubstituted aliphatics, saturated aliphatics, unsaturated aliphatics, aromatics, polyaromatics, substituted aromatics, hetero-aromatics, amines, primary amines, secondary amines, tertiary amines, aliphatic amines, carbonyls, carboxyls, amides, esters, amino acids, peptides, polypeptides, and combinations thereof.

To be clear, when the dashed lines in formula (III) are bonds, then the rings are aromatic, and when the dashed lines in formula (III) are not bonds, then the rings are cyclic aliphatic.

The epoxy component and CAF are present in the curable epoxy system at a stoichiometric weight ratio in a range of from 1:1 to 1.4:1, or 1:1 to 1.3:1, or a 1:1 to 1.2:1 of the epoxy component to CAF. In one particular embodiment, the epoxy component and CAF are present in the curable epoxy system at a stoichiometric weight ratio of about 1.2:1 of the epoxy component to CAF.

The curable epoxy system can further comprise a resin component and at least one curing agent in addition to CAF.

The resin component includes one or more of an epoxy resin, a bismaleimide resin, a phenolic resin, cyanate ester resins, benzoxazine resins, or combinations thereof. In one embodiment, the resin component is one or more epoxy resins.

Suitable epoxy resins can include those based on glycidyl epoxy and/or non-glycidyl epoxy resins. It will be understood that glycidyl epoxies are those prepared via a condensation reaction of appropriate dihydroxy compounds, dibasic acid or a diamine and epichlorohydrin. Non-glycidyl epoxies are typically formed by peroxidation of olefinic double bonds.

Suitable curing agents include those which facilitate the curing of the epoxy-functional groups and, particularly, facilitate the ring opening polymerization of such epoxy-functional groups. Examples of suitable curing agents include cyanoguanidine; amines, including aromatic, aliphatic and alicyclic amines; guanidine derivatives; anhydrides; polyols; Lewis Acids; substituted ureas; imidazoles; hydrazines; and silicones.

In one particular embodiment, the at least one curing agent is selected from an amine, an anhydride, a polyol, and combinations thereof.

Non-limiting examples of amines suitable as curing agents include benzenediamine, 1,3-diaminobenzene; 1,4-diaminobenzene; 4,4'-diamino-diphenylmethane; polyaminosulphones, such as 4,4'-diaminodiphenyl sulphone (4,4'-DDS), 4-aminophenyl sulphone, and 3,3'-diaminodiphenyl sulphone (3,3'-DDS); dicyanpolyamides, such as dicyandiamide; imidazoles; 4,4'-methylenedianiline; bis(4-amino-3,5-dimethylphenyl)-1,4-diisopropylbenzene; bis(4-aminophenyl)-14-diisopropylbenzene; ethylenediamine (EDA); 4,4'-methylenebis-(2,6-diethyl)-aniline (MDEA); m-xylenediamine (mXDA); diethylenetriamine (DETA); triethylenetetramine (TETA); trioxatridecanediamine (TTDA); 4,4'-methylenebis-(3-chloro,2,6-diethyl)-aniline (MCDEA); 4,4'-methylenebis-(2,6-diisopropyl)-aniline (M-DIPA); 3,5-diethyl toluene-2,4/2,6-diamine (D-ETDA 80); 4,4'-methylenebis-(2-isopropyl-6-methyl)-aniline (M-MIPA); 4-chlorophenyl-N,N-dimethyl-urea; 3,4-dichlorophenyl-N,N-dimethyl-urea; 9,9-bis(3-methyl-4-aminophenyl)fluorene; 9,9-bis(4-aminophenyl)fluorene; diaminocyclohexane (DACH), isophoronediamine (IPDA); 4,4'-diamino dicyclohexyl methane; bisaminopropylpiperazine; and N-aminoethylpiperazine.

In one particular embodiment, the at least one curing agent is 4,4'-diaminodiphenyl sulphone.

Non-limiting examples of anhydrides suitable as curing agents include polycarboxylic anhydrides, such as nadic anhydride, methylnadic anhydride, phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, hexachloroendomethylene-tetrahydrophthalic anhydride, trimellitic anhydride, pyromellitic dianhydride, maleic anhydride, succinic anhydride, nonenylsuccinic anhydride, dodecenylsuccinic anhydride, polysebacic polyanhydride, and polyazelaic polyanhydride.

Non-limiting examples of polyols suitable as curing agents include ethylene glycol, poly(propylene glycol), and polyvinyl alcohol.

Additional curing agents include phenol-formaldehyde resins, such as: the phenol-formaldehyde resin having an average molecular weight of about 550-650 Daltons, the p-t-butylphenol-formaldehyde resin having an average molecular weight of about 600-700 Daltons, and the p-n-octylphenol-formaldehyde resin, having an average molecular weight of about 1200-1400 Daltons, these being available as HRJ 2210, HRJ-2255, and SP-1068, respectively, from Schenectady Chemicals, Inc., Schenectady, N.Y.

The curable epoxy system can further include at least one additive selected from a thermoplastic particle, a flexibilizer, a toughening agent, an accelerator, a core shell rubber, a wetting agent, a flame retardant, a pigment or dye, a plasticizer, a UV absorber, a viscosity modifier, a filler, a conducting particle, a viscosity modifier, and combinations thereof.

Non-limiting examples of the thermoplastic particle include polyethersulfones, polyetherimides, and polysulphones which are soluble in the epoxy component and/or the resin component.

Examples of the toughening agent include, without limitation, polyamides, copolyamides, polyimides, aramids, polyketones, polyetheretherketones, polyarylene ethers, polyesters, polyurethanes, polysulphones, polyethersulphones, high performance hydrocarbon polymers, liquid crystal polymers, PTFE, elastomers, segmented elastomers such as reactive liquid rubbers based on homo or copolymers of acrylonitrile, butadiene, styrene, cyclopentadiene, acrylate, polyurethane rubbers, and polyether sulphone (PES) or core shell rubber particles.

Non-limiting examples of the accelerators include urea-containing compounds such as, for example, 3-(3,4-Dichlorophenyl)-1,1-dimethylurea, 3-(4-Chlorophenyl)-1,1-dimethylurea, and 3,3'-(4-methyl-1,3-phenylene)bis(1,1-dimethylurea).

In one embodiment, the at least one additive is present in the curable epoxy system in an amount less than 35% by weight, or less than 30% by weight, or less than 25% by weight of the curable epoxy system.

The combined amount of the epoxy component and CAF present in the curable epoxy system is greater than 35% by weight, or greater than 40% by weight, or greater than 50% by weight, or greater than 60% by weight, or greater than 70% by weight, or greater than 80% by weight of the curable epoxy system.

In one particular embodiment, the curable epoxy system has a cure enthalpy of less than 300 J/g, or less than 250 J/g, or less than 200 J/g. In another embodiment, the curable epoxy system has a cure enthalpy ranging from 150 J/g to 300 J/g, or from 175 J/g to 300 J/g, or from 200 J/g to 300 J/g, or from 200 J/g to 250 J/g.

In a preferred embodiment, the curable epoxy system has a cure enthalpy of less than 300 J/g, or less than 250 J/g, or less than 200 J/g, and a Tg of greater than 190° C. In another preferred embodiment, the curable epoxy system has a cure enthalpy ranging from 150 J/g to 300 J/g, or from 175 J/g to 300 J/g, or from 200 J/g to 300 J/g, or from 200 J/g to 250 J/g and a Tg of greater than 190° C.

In another embodiment, the curable epoxy system has a cure enthalpy of less than 300 J/g, or less than 250 J/g, or less than 200 J/g when consisting of the epoxy component and 9,9-bis(4-amino-3-chlorophenyl)fluorene.

According to another aspect, the present disclosure is directed to a method of curing the curable epoxy system. The method comprises heating the curable epoxy system at a set cure temperature ranging from about 100 to 220° C., or from about 120 to 200° C., or from about 140 to 180° C. for a time sufficient to produce an at least partially cured composite.

The time sufficient to produce an at least partially cured composite can be in a range of from about 2 minutes to 24 hours, or from about 15 minutes to 10 hours, or from about 30 minutes to about 2 hours.

The set cure temperature is attained by heating the curable epoxy system at a cure ramp rate in a range of from about 0.1° C. per minute to about 25° C. per minute, or from about 0.5° C. per minute to about 10° C. per minute, or from about 1° C. per minute to about 10° C. per minute, or from about 2° C. per minute to about 10° C. per minute, or from about 3° C. per minute to about 10° C. per minute, or from about 4° C. per minute to about 10° C. per minute, or from about 5° C. per minute to about 10° C. per minute, or from greater than 5° C. per minute to about 25° C., or from 6° C. per minute to about 10° C. per minute, or from 7° C. per minute to about 10° C. per minute until the set cure temperature is achieved.

In an alternative embodiment, the set cure temperature is immediately reached (e.g., via a preheated oven) and the curable epoxy system is heated at the set cure temperature for a time sufficient to produce an at least partially cured composite. This technique is used in, for example, liquid resin processing methods (e.g., injection molding).

In one particular embodiment when the curable epoxy system is coated, layered, injected, poured, or similarly deposited on a substrate or into a mold at a thickness ranging from 0.5 to 15 mm, or from 1 to 15 mm, or from 2 to 15 mm, the method of curing the curable epoxy system at such a thickness comprises heating the curable epoxy system at a set cure temperature from about 150° C. to about 220° C., or from about 160° C. to 200° C., or from about 170° C. to about 190° C., or from about 175° C. to about 185° C., for a time in a range of from about 1 hour to 4 hours, or from about 1.5 hours to about 2.5 hours, or from about 1.75 hours to about 2.25 hours, or about 2 hours.

In another particular embodiment when the curable epoxy system is coated, layered, injected, poured, or similarly deposited on a substrate or into a mold at a thickness greater than 15 mm (for example, 15 mm to 60 mm, or from 15 mm to 50 mm), the method of curing the curable epoxy system at such a thickness comprises (i) heating the curable epoxy system at a set cure temperature from about 120° C. to about 220° C., or from about 130° C. to 170° C., or from about 140° C. to about 160° C., or from about 145° C. to about 155° C., or at about 150° C. for a time ranging from about 2 hours to about 4 hours, or from about 2.5 hours to about 3.5 hours, or from about 2.75 hours to about 3.25 hours, or about 3 hours, and then (ii) heating the curable epoxy system at a set cure temperature from about 150° C. to about 220° C., or from about 160° C. to 200° C., or from about 170° C. to about 190° C., or from about 175° C. to about 185° C., for a time in a range of from about 1 hour to 4 hours, or from about 1.5 hours to about 2.5 hours, or from about 1.75 hours to about 2.25 hours, or about 2 hours.

In a preferred embodiment, the difference between the set cure temperature and the maximum temperature reached in the center of the curable epoxy system during curing is less than 20° C., or less than 15° C., or less than 10° C., or less than 5° C., or less than 2° C., or less than 1° C.

In another aspect, the present disclosure is directed to composites produced by curing the curable epoxy system as described herein.

In yet another aspect, the present disclosure is directed to a curable fiber reinforced epoxy system comprising the curable epoxy system described herein and a fibrous material.

The fibrous material may be synthetic or natural fibers or any other form of material or combination of materials that, combined with the curable epoxy system disclosed herein and cured, forms a composite product. The fibrous material can be in the form of a reinforcement web or tows and can either be provided via spools of fiber that are unwound or from a roll of textile and may be in the form of random, knitted, non-woven, multi-axial, or any other suitable pattern. The fibrous material can also be pre-shaped (i.e., a fibrous preform).

Exemplary fibers include glass, carbon, graphite, boron, basalt, hemp, seagrass, hay, flax, straw, coconut, ceramic and aramid. Hybrid or mixed fiber systems may also be envisaged. The use of cracked (i.e. stretch-broken) or selectively discontinuous fibers may be advantageous to facilitate lay-up of the product and improve its capability of being shaped. Although a unidirectional fiber alignment is preferable for structural applications, other forms may also be used. Typical textile forms include simple textile fabrics, knit fabrics, twill fabrics and satin weaves. It is also possible to envisage using non-woven or non-crimped fiber layers. The surface mass of fibers within the fibrous reinforcement is generally 80-4000 g/m$^2$ preferably 100-2500 g/m$^2$, and especially preferably 150-2000 g/m$^2$. The number of carbon filaments per tow can vary from 3000 to 320,000, again preferably from 6,000 to 160,000 and most preferably from 12,000 to 48,000. For fiberglass reinforcements, fibers of 600-2400 tex are particularly adept.

Exemplary layers of unidirectional fibrous tows are made from HexTow® carbon fibers, which are available from Hexcel Corporation (Stamford, Conn., USA). Suitable Hex-Tow® carbon fibers for use in making unidirectional fiber tows include: IM7 carbon fibers, which are available as tows that contain 6,000 or 12,000 filaments and weight 0.223 g/m and 0.446 g/m respectively; IM8-IM10 carbon fibers, which are available as tows that contain 12,000 filaments and weigh from 0.446 g/m to 0.324 g/m; and AS7 carbon fibers, which are available in tows that contain 12,000 filaments and weigh 0.800 g/m, tows containing up to 80,000 or 50,000 (50K) filaments may be used such as those containing about 25,000 filaments available from Toray (Chuo, Tokyo, Japan) and those containing about 50,000 filaments available from Zoltek (St. Louis, Mo., USA. The tows typically have a width of from 3 to 7 mm and are fed for impregnation on equipment employing combs to hold the tows and keep them parallel and unidirectional.

In one embodiment, the curable fiber reinforced epoxy system is in the form of a prepreg. The term "prepreg" is used to describe a fibrous material impregnated with a resin in the uncured or partially cured state and ready for curing. The fibrous material of the prepregs will be substantially impregnated with the curable epoxy system described herein and prepregs with a curable epoxy system content of from 20 to 85 wt % of the total prepreg weight are preferred, or more preferably with 30 to 50 wt % of the curable epoxy system based on the weight of the prepreg. The prepregs of this invention can be produced by impregnating the fibrous material with the curable epoxy system. In order to increase the rate of impregnation, the process is preferably carried out at an elevated temperature so that the viscosity of the resin is reduced. However it must not be so hot for sufficient length of time that premature curing of the curable epoxy system occurs. Thus, the impregnation process is preferably carried out at temperatures in the range of from 20° C. to 90° C. The resin may be applied to the fibrous material at a temperature in this range and consolidated into the fibrous material by pressure such as that exerted by passage through one or more pairs of nip rollers.

The prepreg of the present disclosure may be prepared by feeding the components to a continuous mixer where a homogenous mixture is formed. The mixing is typically performed at a temperature in the range 35 to 180° C., or 35 to 150° C., or 35 to 120° C., or 35 to 80° C. The mixture may then be cooled and pelletized or flaked for storage. Alternatively, the mixture may be fed directly from the continuous mixer onto a prepreg line where it is deposited onto a moving fibrous layer and consolidated into the fibrous layer, usually by passage through nip rollers. The prepreg may then be rolled and stored, or transported to the location at which it is to be used.

In another embodiment, the curable fiber reinforced epoxy system comprises a fibrous material in the form of a fibrous preform and prepared using liquid resin processing. Liquid resin processing comprises infusing the fibrous material (e.g., a fibrous preform) in a mold, typically with or without pressure to draw the curable epoxy system through a stack or preformed shape of the fibrous material. The speed and distance of the infusing of the fibrous material are dependent on the permeability of the fibrous material, the pressure gradient acting on the infused curable epoxy system and the viscosity of the curable epoxy system. Suitably the curable epoxy system is drawn through the reinforcing stack at a temperature ranging from about 35 to 200° C., or 35 to 180° C., or 35 to 150° C., or 35 to 120° C., or 35 to 80° C.

According to another aspect, the present disclosure is directed to a method of curing the curable fiber reinforced epoxy system comprising heating the curable fiber reinforced epoxy system at a set cure temperature ranging from about 100 to 220° C., or from about 120 to 200° C., or from about 140 to 180° C. for a time sufficient to produce an at least partially cured composite. The time sufficient to produce an at least partially cured composite can be in a range of from about 2 minutes to 24 hours, or from about 15 minutes to 10 hours, or from about 30 minutes to about 2 hours.

The set cure temperature is attained by heating the curable fiber reinforced epoxy system at a cure ramp rate in a range of from about 0.1° C. per minute to about 25° C. per minute, or from about 0.5° C. per minute to about 10° C. per minute, or from about 1° C. per minute to about 10° C. per minute, or from about 2° C. per minute to about 10° C. per minute, or from about 3° C. per minute to about 10° C. per minute, or from about 4° C. per minute to about 10° C. per minute, or from about 5° C. per minute to about 10° C. per minute, or from greater than 5° C. per minute to about 25° C., or from 6° C. per minute to about 10° C. per minute, or from 7° C. per minute to about 10° C. per minute until the set cure temperature is achieved.

In an alternative embodiment, the set cure temperature is immediately reached (e.g., via a preheated oven) and the curable fiber reinforced epoxy system is heated at the set cure temperature for a time sufficient to produce an at least partially cured composite. This technique is used in, for example, liquid resin processing methods (e.g., injection molding).

In one particular embodiment when the curable fiber reinforced epoxy system is coated, layered, injected, poured, or similarly deposited on a substrate or into a mold at a thickness ranging from 0.5 to 15 mm, or from 1 to 15 mm, or from 2 to 15 mm, the method of curing the curable fiber reinforced epoxy system at such a thickness comprises heating the curable epoxy system at a set cure temperature from about 150° C. to about 220° C., or from about 160° C. to 200° C., or from about 170° C. to about 190° C., or from about 175° C. to about 185° C., for a time in a range of from about 1 hour to 4 hours, or from about 1.5 hours to about 2.5 hours, or from about 1.75 hours to about 2.25 hours, or about 2 hours.

In another particular embodiment when the curable fiber reinforced epoxy system is coated, layered, injected, poured, or similarly deposited on a substrate or into a mold at a thickness greater than 15 mm (for example, 15 mm to 60 mm, or from 15 mm to 50 mm), the method of curing the curable fiber reinforced epoxy system at such a thickness comprises (i) heating the curable fiber reinforced epoxy system at a set cure temperature from about 120° C. to about 220° C., or from about 130° C. to 170° C., or from about 140° C. to about 160° C., or from about 145° C. to about 155° C., or at about 150° C. for a time ranging from about 2 hours to about 4 hours, or from about 2.5 hours to about 3.5 hours, or from about 2.75 hours to about 3.25 hours, or about 3 hours, and then (ii) heating the curable fiber reinforced epoxy system at a set cure temperature from about 150° C. to about 220° C., or from about 160° C. to 200° C., or from about 170° C. to about 190° C., or from about 175° C. to about 185° C., for a time in a range of from about 1 hour to 4 hours, or from about 1.5 hours to about 2.5 hours, or from about 1.75 hours to about 2.25 hours, or about 2 hours.

In a preferred embodiment, the difference between the set cure temperature and the maximum temperature reached in the center of the curable fiber reinforced epoxy system during curing is less than 20° C., or less than 15° C., or less than 10° C., or less than 5° C., or less than 2° C., or less than 1° C.

In another aspect, the present disclosure is directed to composites produced by curing the curable fiber reinforced epoxy system as described herein.

The composites described herein may be used for any intended purpose, including, for example, in automotive and aerospace vehicles and, particularly, for use in commercial and military aircraft. The composites may also be used for other structural applications to make load-bearing parts and structures in general, for example they may be used in the spar or blades of wind turbine and in sporting goods such as skis.

EXAMPLES

Examples are provided below. However, the present disclosure is to be understood to not be limited in its application to the specific experiments, results, and laboratory procedures disclosed herein below. Rather, the Examples are simply provided as one of various embodiments and are meant to be exemplary and not exhaustive.

TABLE 1

| Compound | Description | Supplier |
| --- | --- | --- |
| Araldite ® MY 721 resin | N,N,N',N'-Tetraglycidyl-4,4'-methylenebisbenzenamine ("TGEDDM") | Huntsman Corp. or affiliate thereof |
| Araldite ® MY 0510 trifunctional resin | Triglycidyl of para-aminophenol ("TGEPAP") | Huntsman Corp. or affiliate thereof |
| Araldite ® MY 0610 trifunctional resin | Triglycidyl of meta-aminophenol ("TGEMAP") | Huntsman Corp. or affiliate thereof |
| Tactix ® 556 resin | Low moisture, hydrocarbon epoxy novolac resin | Huntsman Corp. or affiliate thereof |
| Araldite ® MY 0816 resin | Naphthalene-based high performance bifunctional epoxy resin | Huntsman Corp. or affiliate thereof |
| LME 10169 resin | Fluoren-based di-epoxy resin | Huntsman Corp. or affiliate thereof |
| Araldite ® GY 285 resin | Diglycidylether of bisphenol F | Huntsman Corp. or affiliate thereof |
| Aradur ® 9664-1 curing agent | Micropulverized 4,4'-diaminodiphenyl sulfone ("4,4'-DDS") | Huntsman Corp. or affiliate thereof |
| Aradur ® 9719-1 curing agent | Micropulverized 3,3'-diaminodiphenyl sulfone ("3,3'-DDS") | Huntsman Corp. or affiliate thereof |
| Aradur ® 5200 US curing agent | Low viscosity, non-MDA based liquid aromatic diamine | Huntsman Corp. or affiliate thereof |
| PES VW-10200 | Polyether sulfone, CAS 1289096-79-2 | Solvay Corporation |
| Polyimide Toughener | Low molecular weight polyimide | Huntsman Corp. or affiliate thereof |
| Orgasol ® 1002 D Nat 1 Polyamide 6 | Polyamide powder | Arkema Inc. |
| Orgasol ® 3502 D Nat 1 Copolyamide 6/12 | Polyamide powder | Arkema Inc. |

Comparative Examples 1-1E

Comparative ("Comp.") Examples 1-1E were formulated using the components shown in Table 2 below. For each of Comparative Examples 1-1E, an epoxy was mixed with Aradur® 9664-1 curing agent at a stoichiometric weight ratio of 1:1 and at 23° C. for 5 minutes until a homogeneous mixture was obtained. The amount (in grams) for each component is provided in Table 2.

TABLE 2

| | EPOXY | | | | | | CURING AGENT |
|---|---|---|---|---|---|---|---|
| Comp. Ex. | Araldite® MY 721 resin | Araldite® MY 0510 trifunctional resin | Araldite® MY 0610 trifunctional resin | Tactix® 556 resin | Araldite® MY 0816 resin | BCDGE | Aradur® 9664-1 curing agent |
| 1 | 32.2 | — | — | — | — | — | 17.8 |
| 1A | — | 30.8 | — | — | — | — | 19.2 |
| 1B | — | — | 30.5 | — | — | — | 19.5 |
| 1C | — | — | — | 39.1 | — | — | 10.9 |
| 1D | — | — | — | — | 34.9 | — | 15.1 |
| 1E | — | — | — | — | — | 38.2 | 11.8 |

A Q-2000 Differential Scanning Calorimeter from TA Instruments was used to determine onset of reaction temperatures, peak temperatures, and cure enthalpies for each of the Comparative Examples 1-1E set forth above. The samples were heated from 25° C. to 350° C. at a cure ramp rate of 10° C./minute. Additionally, the Tg for Comparative Examples 1-1E was measured using DSC as well as Dynamic Mechanical Analysis ("DMA") over cure schedule of hours at 180° C. The Tg measured by DMA was determined using Dynamic Mechanical Analyzer TA Q 800 with: single/dual cantilever, 3-point bend mode, and specimens up to 50 mm in length, 15 mm in width, and 7 mm in thickness. Table 3 details the onset of reaction temperature, peak temperature, enthalpy, and Tg for each of Comparative Examples 1-1E.

TABLE 3

| | Comparative Examples | | | | | |
|---|---|---|---|---|---|---|
| Properties | 1 | 1A | 1B | 1C | 1D | 1E |
| Onset of Reaction Temp (° C.) | 182 | 173.6 | 180 | 188 | 170 | 180 |
| Peak Temperature (° C.) | 217 | 216 | 237 | 245 | 212 | 228 |
| Enthalpy (J/g) | 691 | 656 | 665 | 364 | 381.5 | 326.3 |
| Tg (DSC; ° C.) | 220 | 225.5 | 221 | 188 | 204 | 192.5 |
| Tg (DMA; ° C.) | 225 | 227 | 221 | 188 | 205 | 194 |

Comparative Examples 2-2B and Example 2C

Comparative Examples 2-2B and Example 20 were formulated using the components shown in Table 4 below. For each of Comparative Examples 2-21B, bisphenol C diglycidyl ether ("BDGE") was mixed with either Aradur®9664-1 curing agent, Aradur® 9719-1 curing agent, or Aradur®5200 US curing agent at a stoichiometric weight ratio of 1:1 and at 23° C. for 5 minutes until a homogeneous mixture was obtained. Example 20 followed a similar procedure except that 9,9-bis(4-amino-3-chlorophenyl)fluorene ("AF") was used as the curing agent. The amount (in grams) for each component is provided in Table 4.

TABLE 4

| | | CURING AGENT | | | |
|---|---|---|---|---|---|
| Ex. | EPOXY BCDGE | Araduring® 9664-1 curing agent | Aradur® 9719-1 curing agent | Aradur® 5200 US curing agent | CAF |
| Comp. Ex. 2 | 38.3 | 11.7 | — | — | — |
| Comp. Ex. 2A | 38.3 | — | 11.7 | — | — |
| Comp. Ex. 2B | 41 | — | — | 9 | — |
| 2C | 33.2 | — | — | — | 16.8 |

DSC was also used to determine onset of reaction temperatures, peak temperatures, and enthalpies for each of examples 2-2C set forth above. The samples were heated from 25° C. to 350° C. at a cure ramp rate of 10° C./minute. The Tg for each of Comparative Examples 2-2B was measured using DSC as well as Dynamic Mechanical Analysis over a cure schedule of 2 hours at 180° C. The Dynamic Mechanical Analyzer TA Q 800, as described above, was used for the DMA measured Tg. The Tg for example 2C was similarly measured using a cure schedule of 3 hours at 180° C. Table 5 details the onset of reaction temperature, peak temperature, enthalpy, and Tg for each of Comparative Examples 2-2B and Example 2C.

TABLE 5

| | Examples | | | |
|---|---|---|---|---|
| Properties | Comp. 2 | Comp. 2A | Comp. 2B | 2C |
| Onset of Reaction Temp (° C.) | 180 | 166 | 154.2 | 192 |
| Peak Temperature (° C.) | 228 | 212 | 204 | 243 |
| Enthalpy (J/g) | 326.3 | 352.1 | 347.3 | 198 |

TABLE 5-continued

| Properties | Comp. 2 | Comp. 2A | Comp. 2B | 2C |
|---|---|---|---|---|
| Tg (DSC; ° C.) | 192.5 | 178.4 | 178 | 193 |
| Tg (DMA; ° C.) | 194 | 183 | 163 | 197 |

Prepreg Examples

Table 6 sets forth the formulations for Comparative Example 3 and Example 3A that were used to form prepregs. The components in Table 6 are provided in grams.

TABLE 6

| Components | Comparative Example 3 | Example 3A |
|---|---|---|
| LME 10169 resin | — | 13.4 |
| Araldite ® MY 0610 trifunctional resin | 25.9 | — |
| Araldite ® MY 0510 trifunctional resin | — | 5.5 |
| Araldite ® MY 721 resin | 10.4 | — |
| Araldite ® GY 285 resin | 17.2 | — |
| BCDGE | — | 39.5 |
| CAF | — | 31.6 |
| Aradur ® 9664-1 curing agent | 21.6 | — |
| PES VW-10200 | 15.5 | — |
| Low molecular weight polyimide | — | 10 |
| Orgasol ® 1002 D Nat 1 Polyamide 6 | 4.7 | — |
| Orgasol ® 3502 D Nat 1 Copolyamide 6/12 | 4.7 | — |

Comparative Example 3 was prepared by first mixing Araldite® MY 0610 trifunctional resin, Araldite® MY 721 resin, and Araldite® GY 285 resin at a temperature held between 90° C. to 100° C. until a homogenous mixture was obtained. PES VW-10200 RSFP ("PES") was then added to the mixture and heated to a temperature held between 120° C. to 130° C. and mixed until all the PES dissolved. The mixture was then allowed to cool down and Orgasol® 1002 D Nat 1 Polyamide 6 and Orgasol® 3502 D Nat 1 Copolyamide 6/12 were added under high shear (i.e., 2000-2500 rpms) for 10 to 20 minutes. The mixture was then discharged at 100° C. on a surface and allowed to cool to room temperature.

Example 3A was prepared by first mixing LME 10169 resin, Araldite® MY 0510 trifunctional resin, and BCDGE at a temperature held between 70° C. to 90° C. until a homogeneous mixture was obtained. CAF was then added and mixed under high shear (i.e., 2000-2500 rpms) for 30 minutes. Polyimide toughener was further added to the mixture under high shear for 10 to 20 minutes while the temperature was maintained below 90° C. The mixture was then discharged at 90° C. on a surface and allowed to cool to room temperature.

Comparative Example 3 and Example 3A were then analyzed via DSC to determine enthalpies for each by individually heating samples of such from 25° C. to 350° C. at a cure ramp rate of 10° C./minute. The Tg for Comparative Example 3 and Example 3A were measured using Dynamic Mechanical Analysis ("DMA") for a cure schedule of 3 hours at 180° C. The Dynamic Mechanical Analyzer TA Q 800, as described above, was used for the DMA measured Tg. Table 7 details the enthalpy and Tg for Comparative Example 3 and Example 3A.

TABLE 7

| Examples | Comp. 3 | 3A |
|---|---|---|
| Enthalpy (J/g) | 523 | 237 |
| Tg (DMA; ° C.) | 205 | 199 |

Comparative Example 3 and Example 3A were then used to form prepregs by individually: (i) hot melting the compositions of comparative example 3 and example 3A into a roll coater to create films and (ii) impregnating the films with unidirectional IM7 carbon fibers, and (iii) allowing the fiber impregnated films to cool to room temperature. Specific details regarding the prepregs, including mechanical properties obtained after curing at 180° C. for 3 hours, are provided in Table 8. The following procedures were used for obtaining the measurements set forth in Table 8.

Interlaminar Shear Strength (ILSS) Test

The ILSS of the prepreg examples were using ASTM D2344.

The ILSS of the prepreg examples was also assessed using ASTM D2344 after subjecting the prepreg examples to boiling water for 72-hours (the "72-hour hot wet process").

The percent retention was calculated based on the initial, dry ILSS measurement and the ILSS measured after the 72-hour hot wet process.

Tensile Strength, Modulus, and Strain

The tensile strength, modulus, and strain for the prepreg examples were measured using ASTM D3039.

The tensile strength, modulus, and strain of the prepreg examples was also assessed using ASTM D3039 after subjecting the samples to boiling water for 72-hours.

The percent retention for the tensile strength and modulus was calculated based on the initial, dry measurements and the measurements obtained using the 72-hour hot wet process.

Compression Strength and Modulus

Compression strength and modulus for the prepreg examples were measured using ASTM D695.

Compression After Impact ("CAI")

CAI strength and modulus measurements for the prepreg examples were obtained using ASTM D7136 and ASTM D7137.

TABLE 8

| Measured Properties | Comp. 3 | 3A |
|---|---|---|
| Fiber Fraction Volume | 60 | 60 |
| ILSS, dry (ksi) | 13.6 | 13.9 |
| ILSS, 72-hr hot wet (ksi) | 10.3 | 12.9 |
| ILSS % Retention | 75.7 | 92.8 |
| Tensile Strength, dry (ksi) | 352 | 341 |

TABLE 8-continued

| Measured Properties | Examples | |
|---|---|---|
| | Comp. 3 | 3A |
| Tensile Strength, 72-hr hot wet (ksi) | 308 | 309 |
| % Retention (Tensile Strength) | 87.5 | 90.6 |
| Tensile Modulus, dry (ksi) | 25.1 | 23.5 |
| Tensile Modulus, 72-hr hot wet (ksi) | 22.4 | 23.7 |
| % Retention (Tensile Modulus) | 89.20 | 100.1 |
| % Tensile Strain, dry | 2.5 | 1.4 |
| % Tensile Strain, 72-hr hot wet | 2.2 | 1.4 |
| Compression Strength (msi) | 160 | 161 |
| Compression Modulus (msi) | 21 | 19.4 |
| CAI Strength (ksi) | 40 | 38 |
| CAI Modulus (ksi) | 8093 | 7900 |

Comparative Example 3 represents an exemplary toughened aerospace prepreg formulation based predominately on Araldite® MY 721 resin, Araldite® MY 0510 trifunctional resin, and Aradur® 9664-1 curing agent. This formulation exhibits a good balance of thermal and mechanical properties; however, as typical of formulations known in the art, this formulation has a characteristically high reaction enthalpy of 523 J/g.

The formulation of Example 3A is designed to have high thermal and mechanical properties comparable to formulations such as Comparative Example 3; however, because Example 3A also contains a combination of CAF and BCDGE the reaction enthalpy is only 237 J/g.

Cure Behavior

To assess the predictable cure behavior of Example 3A and Comparative Example 3, simulations of carbon fiber based parts infused with Example 3A and Comparative Example 3 were carried out using the following equation:

$$\frac{d\alpha}{dt} = k_1(1+\alpha)^{n_1}\alpha^{m_1} + k_2(1+\alpha)^{n_2}\alpha^{m_2}$$

wherein a is the degree of cure, $k_1$ and $k_2$ are rate coefficients determined by the Arrhenius equation, and $n_1$, $n_2$, $m_1$, and $m_2$ are experimentally determined reaction orders. The variables in the above-noted equation were determined by first analyzing comparative Example 3 and Example 3A using a Q-2000 Differential Scanning Calorimeter from TA Instruments with varying ramp rates and isothermals to create a DSC heat flow and then inputting such data into the Thermokinetics software program available from NETZSCH-Gertebau GmbH (Selb, Germany). The above-noted equation was then used to carry out simulations to determine the degree of cure as a function of time for a variety of properties.

In particular, three different properties were individually varied in the simulations to assess their likely effect on cure behavior of the parts. Such properties included: cure ramp rate (see Table 9), fiber fraction volume (see Table 10), and part thickness (see Table 11).

To study the effect on the temperature and cure behavior of the parts, five parameters were investigated and reported for each simulation: the maximum overshoot temperature, which shows the max temperature reached in center of the part; ΔT1, which is the difference between the set temperature in the cure profile and the maximum temperature reached in the center of the part; ΔT2, which is the difference between the maximum temperature reached in the center and the maximum temperature reached on surface of the part; and ΔT1 per thickness of the part and ΔT2 per thickness of the part, which standardize the two values and compare them for various thicknesses.

Variable Cure Ramp Rates

Carbon fiber based parts containing Comparative Example 3 and Example 3A and having a thickness of 15 mm and a fiber volume fraction 60% were assessed. Each sample was assessed using a cure profile of 2 hours at 180° C. and a different cure ramp rate as specified in Table 9.

TABLE 9

| | | Example 3A | | | Comp. Example 3 | | | ΔT$_1$/t | | ΔT$_2$/t | |
|---|---|---|---|---|---|---|---|---|---|---|---|
| Sample # | R$_{CR}$ | Max Overshoot | ΔT$_1$ | ΔT$_2$ | Max Overshoot | ΔT$_1$ | ΔT$_2$ | Ex. 3A | Comp. Ex. 3 | Ex. 3A | Comp. Ex. 3 |
| 1 | 1 | 187.8 | 7.8 | 1.2 | 205.7 | 25.7 | 4 | 0.52 | 1.71 | 0.08 | 0.27 |
| 2 | 3 | 191.3 | 11.3 | 1.8 | 214.8 | 34.8 | 5.5 | 0.75 | 2.32 | 0.12 | 0.37 |
| 3 | 5 | 191.5 | 11.5 | 1.8 | 216.6 | 36.6 | 5.7 | 0.77 | 2.44 | 0.12 | 0.38 |
| 4 | 10 | 191.5 | 11.5 | 1.8 | 216.5 | 36.5 | 5.7 | 0.77 | 2.43 | 0.12 | 0.38 |

Table 9 demonstrates that increasing the cure ramp rate results in higher overshoot. However, the ΔT1 and ΔT2 values for Example 3A are significantly lower than those obtained for Comparative Example 3. This demonstrates that it is predicted that Example 3A can be cured much faster and with higher degree of uniformity compared to Comparative Example 3.

Variable Fiber Fraction Volume

Carbon fiber based parts containing Comparative Example 3 and Example 3A and having a thickness of 15 mm and a fiber volume fraction varying between 60% 55%, and 50% were assessed. Each sample was assessed using a cure profile of 2 hours at 180° C. and a cure ramp rate of 3° C./minute. The five parameters measured for each sample are set forth below in Table 10.

TABLE 10

| Sample # | $V_f$ (%) | Example 3A | | | Comp. Example 3 | | | $\Delta T_1/t$ | | $T_2/t$ | |
|---|---|---|---|---|---|---|---|---|---|---|---|
| | | Max Over-shoot | $\Delta T_1$ | $\Delta T_2$ | Max Over-shoot | $\Delta T_1$ | $\Delta T_2$ | Ex. 3A | Comp. Ex. 3 | Ex. 3A | Comp. Ex. 3 |
| 5 | 1 | 191.3 | 11.3 | 1.8 | 214.8 | 34.8 | 5.5 | 0.75 | 2.32 | 0.12 | 0.37 |
| 6 | 3 | 193.1 | 13.1 | 2.1 | 223.6 | 43.6 | 7.1 | 0.87 | 2.91 | 0.14 | 0.47 |
| 7 | 5 | 195.2 | 15.2 | 2.6 | 233.5 | 53.5 | 9 | 1.01 | 3.57 | 0.17 | 0.60 |

Table 10 demonstrates that higher fiber volume fraction (or lower resin content) in a composite part is predicted to result in a reduced overshoot temperature. The part with higher fiber volume fraction has less amount of resin, reducing the effect of localized heat generation due to exothermic cure reactions. The data presented in Table 10 also confirms the previously discussed conclusion that Example 3A offers significantly lower thermal deviation from set temperature during the cure process compared to Comparative Example 3.

Variable Part Thickness

Carbon fiber based parts containing Comparative Example 3 and Example 3A and having a thickness varying between 5 and 55 mm and a fiber fraction volume of 60% were assessed. A cure schedule of 2 hours at 180° C. and a cure ramp rate of 1° C./minute was used for parts with a thickness of 5 and 15 mm (i.e., samples 8 and 9). A cure profile with two dwells was used for parts with a thickness of 30 and 50 (i.e., samples 10 and 11): 3 hours at 150° C. followed by 2 hours at 180° C. and a cure ramp rate of 1° C./minute. The five parameters measured for each sample are set forth below in Table 11.

TABLE 11

| Sample # | Thickness (mm) | Example 3A | | | Comp. Example 3 | | | $\Delta T_1/t$ | | $T_2/t$ | |
|---|---|---|---|---|---|---|---|---|---|---|---|
| | | Max Over-shoot | $\Delta T_1$ | $\Delta T_2$ | Max Over-shoot | $\Delta T_1$ | $\Delta T_2$ | Ex. 3A | Comp. Ex. 3 | Ex. 3A | Comp. Ex. 3 |
| 8 | 5 | 182.4 | 2.4 | 0.2 | 186.8 | 6.8 | 0.4 | 0.48 | 1.36 | 0.04 | 0.08 |
| 9 | 15 | 187.7 | 7.7 | 1.1 | 205.7 | 25.7 | 4 | 0.51 | 1.71 | 0.07 | 0.27 |
| 10 | 30 | 162.4 | 12.4 | 3.3 | 185.5 | 35.5 | 9.5 | 0.41 | 1.18 | 0.11 | 0.32 |
| 11 | 50 | 166.7 | 16.7 | 6.4 | 209.3 | 59.3 | 21.2 | 0.33 | 1.19 | 0.13 | 0.42 |

Table 11 shows the predicted effect of part thickness on the overshoot temperature for the two formulations. Table 11 clearly demonstrates the significance of exothermic phenomena during the cure of polymeric composites. An overshoot of 6.8 to 59.3° C. is predicted for Comparative Example 3 while the overshoot for Example 3A is only 2.7 to 16.7° C.

From the above description, it is clear that the present disclosure is well adapted to carry out the object and to attain the advantages mentioned herein as well as those inherent in the present disclosure. While exemplary embodiments of the present disclosure have been described for the purposes of the disclosure, it will be understood that numerous changes may be made which will readily suggest themselves to those skilled in the art which can be accomplished without departing from the scope of the present disclosure and the appended claims.

What is claimed is:

1. A curable epoxy system, comprising: an epoxy component selected from bisphenol C diglycidyl ether, one or more derivatives of bisphenol C diglycidyl ether, and combinations thereof; 9,9-bis(4-amino-3-chlorophenyefluorene; and at least one curing agent capable of facilitating curing of the epoxy component, other than 9,9-bis(4-amino-3-chloropenyl)fluorene; wherein the epoxy component and 9,9-bis(4-amino-3-chlorophenyl)fluorene are present in the curable epoxy system in amounts such that a stoichiometric weight ratio of the epoxy component to 9,9-bis(4-amino-3-chlorophenyl)fluorene is from 1:1 to 1.4:1; and wherein the curable epoxy system has a cure enthalpy of less than 300 J/g and is capable of producing a cured material having a glass transition temperature greater than 190° C.

2. The curable epoxy system of claim 1, wherein the at least one curing agent is selected from an amine curing agent, an anhydride curing agent, a polyol curing agent, and combinations thereof.

3. The curable epoxy system of claim 1, wherein the at least one curing agent is selected from 1,3-diaminobenzene, 1,4-diaminobenzene, 4,4'diamino-diphenylmethane, 4,4'-diaminodiphenyl sulphone, 4-aminophenyl sulphone, 3,3'-diaminodiphenyl sulphone, 4,4'-methylenebis(3-chloro-2,6-diethylaniline), 4,4'-methylenebis(2,6-diethylaniline), and combinations thereof.

4. The curable epoxy system of claim 1, further comprising at least one additive selected from a thermoplastic particle, a flexibilizer, a polyamide toughening agent, an accelerator, a core shell rubber, a wetting agent, a flame retardant, a pigment or dye, a plasticizer, a UV absorber, a viscosity modifier, and combinations thereof.

5. The curable epoxy system of claim 1, wherein the combined amount of the epoxy component, 9,9-bis(4-amino-3-chlorophenyl)fluorene, and the at least one curing agent is greater than 40 wt % based on the weight of the curable epoxy system.

6. A method of curing the curable epoxy system of claim 1, comprising heating the curable epoxy system at a set cure temperature in a range from 100° C. to 220° C. for a time sufficient to produce an at least partially cured material.

7. The method of claim 6, wherein the set cure temperature is attained by heating the curable epoxy system at a cure ramp rate in a range of from 0.5° C. per minute to 25° C. per minute from ambient temperature.

8. The method of claim 6, wherein the difference between the set cure temperature and the maximum temperature reached in the center of the curable epoxy system is less than 20° C.

9. An at least partially cured material obtained by the method of claim 6.

10. A prepreg comprising a fibrous material in contact with the curable epoxy system of claim 1.

11. A method of producing a fiber reinforced composite structure, comprising contacting a fibrous material with the curable epoxy system of claim 1 to form a curable fiber reinforced epoxy system; and curing the curable fiber reinforced epoxy system to form a fiber reinforced composite structure.

12. The method of claim 11, wherein the step of curing the curable fiber reinforced epoxy system comprises heating the curable fiber reinforced epoxy system at a set cure temperature in a range of from 100° C. to 220° C. for a time sufficient to produce an at least partially cured fiber reinforced composite structure.

13. The method of claim 12, wherein the set cure temperature is attained by heating the curable fiber reinforced epoxy system at a cure ramp rate in a range of from 0.5° C. per minute to 25° C. per minute from ambient temperature.

14. The method of claim 12, wherein the difference between the set cure temperature and the maximum temperature reached in the center of the curable fiber reinforced epoxy system is less than 20° C.

15. The method of claim 11, wherein the curable fiber reinforced epoxy system has a thickness of at most 60 mm.

16. A fiber reinforced composite structure obtained by the method of claim 11.

17. An aerospace component comprising the fiber reinforced composite structure of claim 16.

* * * * *